United States Patent
Gurgul et al.

(10) Patent No.: US 12,266,057 B2
(45) Date of Patent: Apr. 1, 2025

(54) INPUT MODALITIES FOR AR WEARABLE DEVICES

(71) Applicant: Snap Inc., Santa Monica, CA (US)

(72) Inventors: Piotr Gurgul, Hergiswil (CH); Sharon Moll, Lachen (CH)

(73) Assignee: Snap Inc., Santa Monica, CA (US)

( * ) Notice: Subject to any disclaimer, the term of this patent is extended or adjusted under 35 U.S.C. 154(b) by 213 days.

(21) Appl. No.: 17/830,708

(22) Filed: Jun. 2, 2022

(65) Prior Publication Data
US 2023/0394770 A1   Dec. 7, 2023

(51) Int. Cl.
| | | |
|---|---|---|
| G06T 19/00 | (2011.01) | |
| G06F 1/16 | (2006.01) | |
| G06F 3/01 | (2006.01) | |
| G06K 19/077 | (2006.01) | |
| G06V 10/82 | (2022.01) | |

(52) U.S. Cl.
CPC ............ *G06T 19/006* (2013.01); *G06F 1/163* (2013.01); *G06F 3/011* (2013.01); *G06K 19/07758* (2013.01); *G06V 10/82* (2022.01)

(58) Field of Classification Search
CPC ........ G06T 19/006; G06F 3/011; G06F 1/163; G06K 19/07758; G06V 10/82
See application file for complete search history.

(56) References Cited

U.S. PATENT DOCUMENTS

| | | |
|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |

(Continued)

FOREIGN PATENT DOCUMENTS

| | | |
|---|---|---|
| CN | 103049761 | 8/2016 |
| CN | 119301547 A | 1/2025 |

(Continued)

OTHER PUBLICATIONS

"International Application Serial No. PCT/US2023/021313, International Search Report mailed Aug. 31, 2023", 4 pgs.

(Continued)

*Primary Examiner* — Terrell M Robinson
(74) *Attorney, Agent, or Firm* — Schwegman Lundberg & Woessner, P.A.

(57) ABSTRACT

Systems, methods, and computer readable media for input modalities for an augmented reality (AR) wearable device are disclosed. The AR wearable device captures images using an image capturing device and processes the images to identify objects. The objects may be people, places, things, and so forth. The AR wearable device associates the objects with tags such as the name of the object or a function that can be provided by the selection of the object. The AR wearable device then matches the tags of the objects with tags associated with AR applications. The AR wearable device presents on a display of the AR wearable device indications of the AR applications with matching tags, which provides a user with the opportunity to invoke one of the AR applications. The AR wearable device recognizes a selection of an AR application in a number of different ways including gesture recognition and voice commands.

20 Claims, 14 Drawing Sheets

(56) References Cited

U.S. PATENT DOCUMENTS

| | | | |
|---|---|---|---|
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,150,482 | B2 | 10/2021 | Mullins et al. |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 2009/0012788 | A1 | 1/2009 | Gilbert et al. |
| 2011/0301934 | A1 | 12/2011 | Tardif |
| 2012/0092328 | A1* | 4/2012 | Flaks ............... G06V 20/10 345/419 |
| 2014/0171036 | A1 | 6/2014 | Simmons |
| 2015/0120293 | A1 | 4/2015 | Wohlert et al. |
| 2015/0185825 | A1* | 7/2015 | Mullins ............... G06F 3/0304 345/633 |
| 2015/0370320 | A1 | 12/2015 | Connor |
| 2016/0163109 | A1* | 6/2016 | Kobayashi ............ G06F 3/011 345/633 |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0012412 | A1* | 1/2018 | Scavezze ............ G06F 18/24 |
| 2018/0158370 | A1 | 6/2018 | Pryor |
| 2018/0293771 | A1* | 10/2018 | Piemonte ............ G06T 11/60 |
| 2019/0107990 | A1* | 4/2019 | Spivack ............. G06T 11/60 |
| 2019/0377487 | A1* | 12/2019 | Bailey ............... G06F 1/163 |
| 2020/0088463 | A1 | 3/2020 | Jeong et al. |
| 2020/0226383 | A1* | 7/2020 | Meier ............... G06V 10/17 |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0191507 | A1 | 6/2021 | Lee |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |

FOREIGN PATENT DOCUMENTS

| | | |
|---|---|---|
| EP | 3707693 | 9/2020 |
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023235111 A1 | 12/2023 |

OTHER PUBLICATIONS

"International Application Serial No. PCT/US2023/021313, Written Opinion mailed Aug. 31, 2023", 5 pgs.

"International Application Serial No. PCT/US2023/021313, International Preliminary Report on Patentability mailed Dec. 12, 2024", 7 pgs.

* cited by examiner

INPUT MODALITIES FOR AR WEARABLE DEVICES

TECHNICAL FIELD

Examples of the present disclosure relate generally to input modalities for augmented reality (AR) wearable devices. More particularly, but not by way of limitation, examples of the present disclosure relate to input modalities for invoking AR applications based on objects identified in images.

BACKGROUND

Users increasingly want augmented reality (AR) wearable devices to operate in a more user-friendly manner. However, often, the AR wearable devices have very little room for interface controls, which may make interfacing with the AR wearable devices difficult or awkward.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
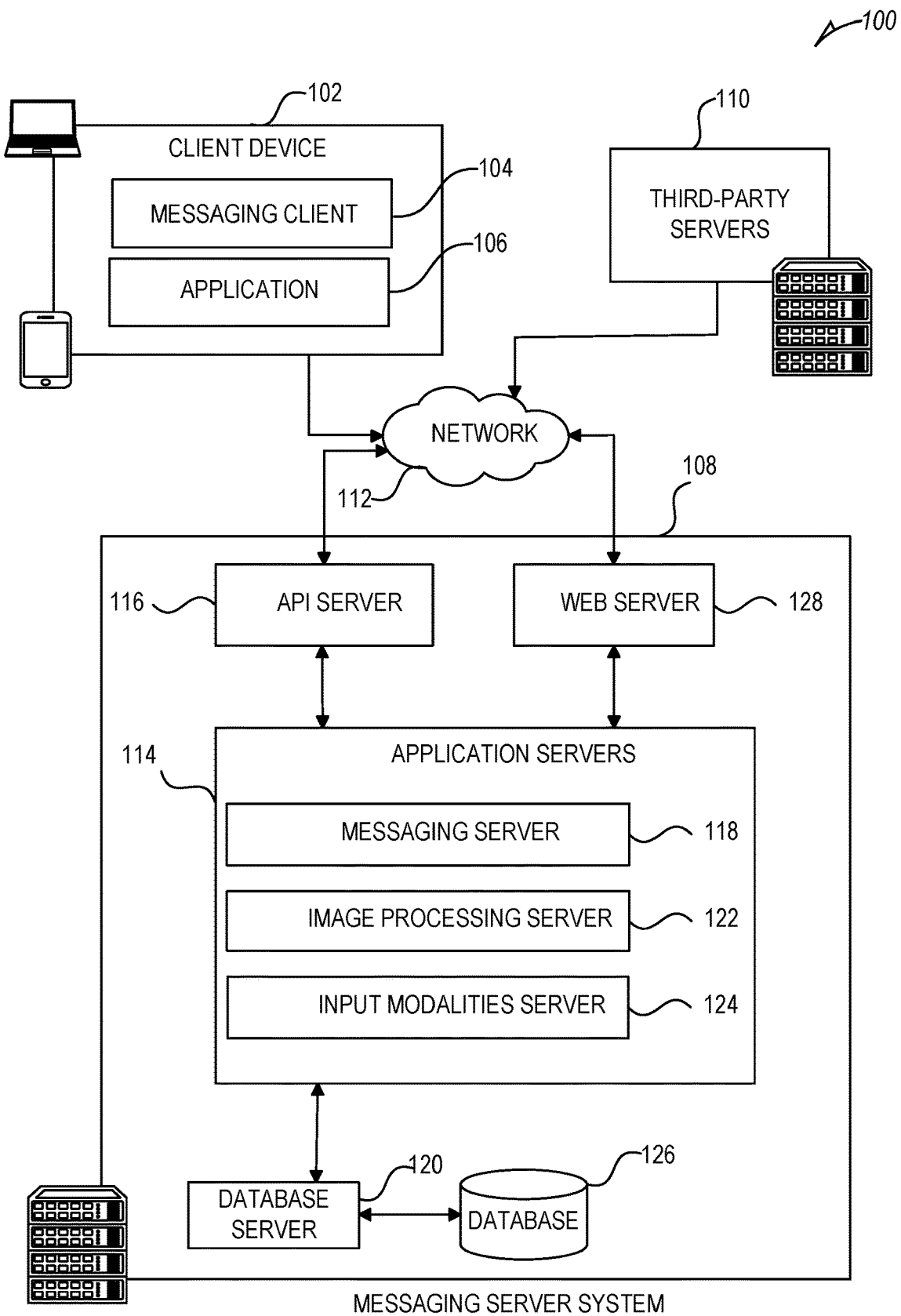
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term AR wearable device is used as an illustrative device; however, one skilled in the art will recognize that the methods, systems, and computer readable medium disclosed herein are applicable to other wearable devices such as mixed reality (MR) wearable devices and virtual reality (VR) wearable devices.

Often AR wearable devices such as AR glasses have limited physical space for user interface items such as buttons, mice, and touchscreens. Some AR wearable devices have one or two buttons or touchpads that the user interacts with on a side temple or frame of the AR wearable device. Yet the number of AR applications that are available continues to grow, which makes it very difficult for the user to select an AR application.

One challenge is how to provide choices of AR applications for the user to select from and how to enable the user to select the AR applications, for example on the limited physical space of a user interface. The application addresses the challenge by processing images captured by the AR wearable device and identifying objects within the image. The application assigns or associates the objects with metadata, in the form of tags such as their name or a function that can be provided by the selection of the object. The AR applications are also associated with metadata such as tags that are selected by the AR application developer or another entity. The application matches the tags of the AR applications with the tags of the objects. The application presents on a display of the AR wearable device indications of the AR applications with matching tags.

Example indications include a name of the object, an icon, a modification of the object by the system, and so forth. The user of the AR wearable device may select one of the indications of the AR applications to invoke a corresponding AR application. There are multiple ways the user may select the indication. For example, an object in the image may be a quick response (QR) code. The system identifies the QR code which is given a tag of QR code. The system finds an AR application with a tag of QR code and presents an indication of the AR application on the display of the wearable AR device near the QR code. For example, the indication may be "QR code". The user may select the "QR code" by moving their head so that the "QR code" is in the center of the display within a selection rectangle 730. The system invokes the AR application that provides functions related to the QR code.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and an input modalities server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The input modalities server 124 supports input modalities for AR wearable devices. The input modalities server 124 receives requests from an AR wearable device and responds to the requests. The requests include sensor data such as an image being sent to the input modalities server 124 for processing. The input modalities server 124 processes the sensor data and identifies objects within the sensor data and returns names of the objects and positions of the objects within the sensor data to the AR wearable device. Another request from the AR wearable device is for AR applications associated with tags such as "QR code" that may be run on the AR wearable device. The input modalities server 124 may load the AR wearable device with AR applications that are likely to be used by a user of the AR wearable device or respond with AR applications based on criteria given to the input modalities server 124 from the AR wearable device. The criteria may be as a limit on the number of AR applications, preferences of the user such as AR applications with links back to the messaging system 100, and so forth.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
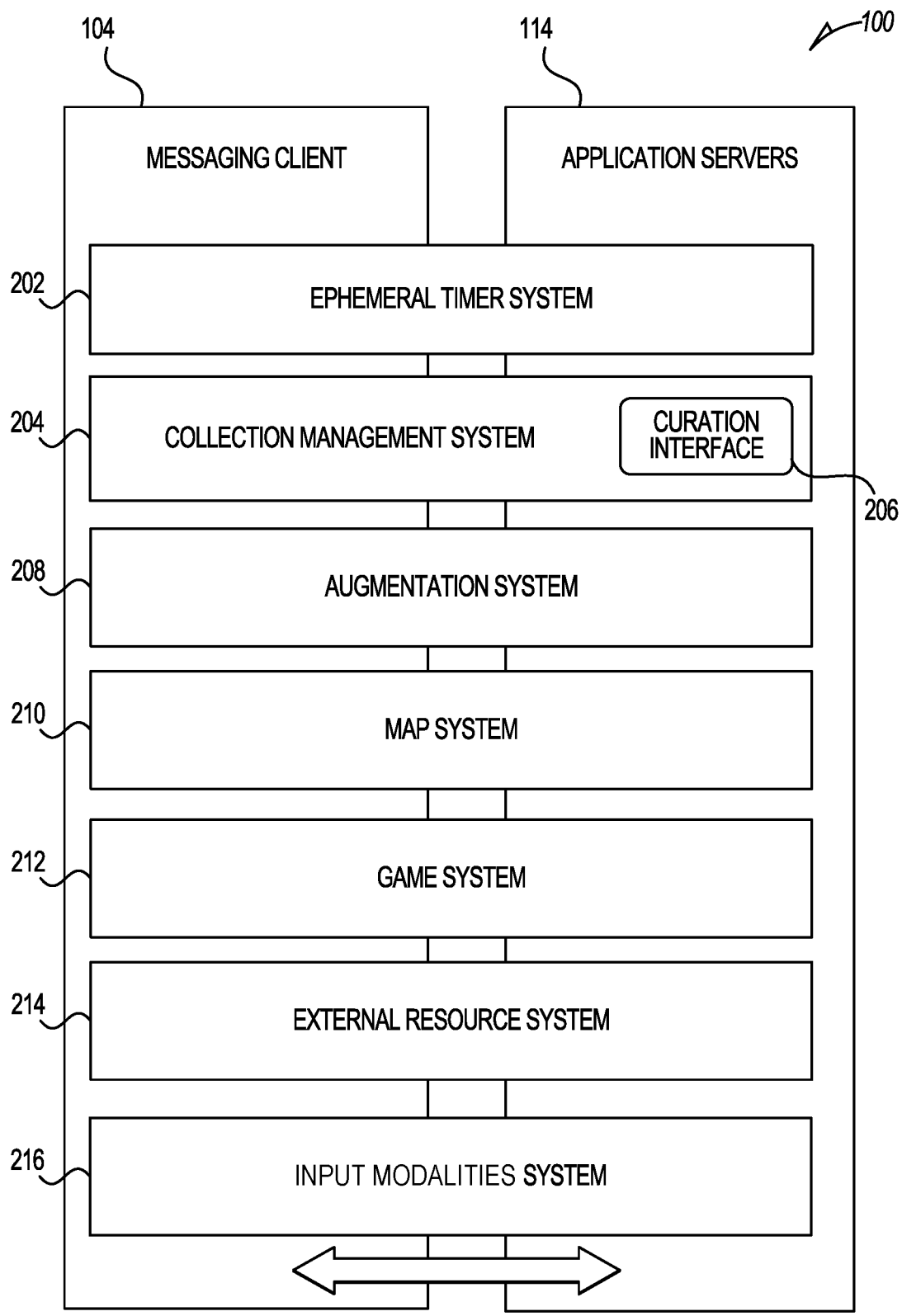
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an input modalities system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The input modalities system 216 supports input modalities for AR wearable devices. The input modalities system 216 receives requests from an AR wearable device and responds to the requests. The requests include sensor data such as an image being sent to the input modalities system 216 for processing. The input modalities system 216 processes the sensor data and identifies objects within the sensor data and returns names of the objects and positions of the objects within the sensor data to the AR wearable device. Another request from the AR wearable device is for AR applications associated with tags that may be run on the AR wearable device. The input modalities system 216 may load the AR wearable device with AR applications that are likely to be used by a user of the AR wearable device or respond with AR applications based on criteria given to the input modalities system 216 from the AR wearable device.

Data Architecture

Figure 3:
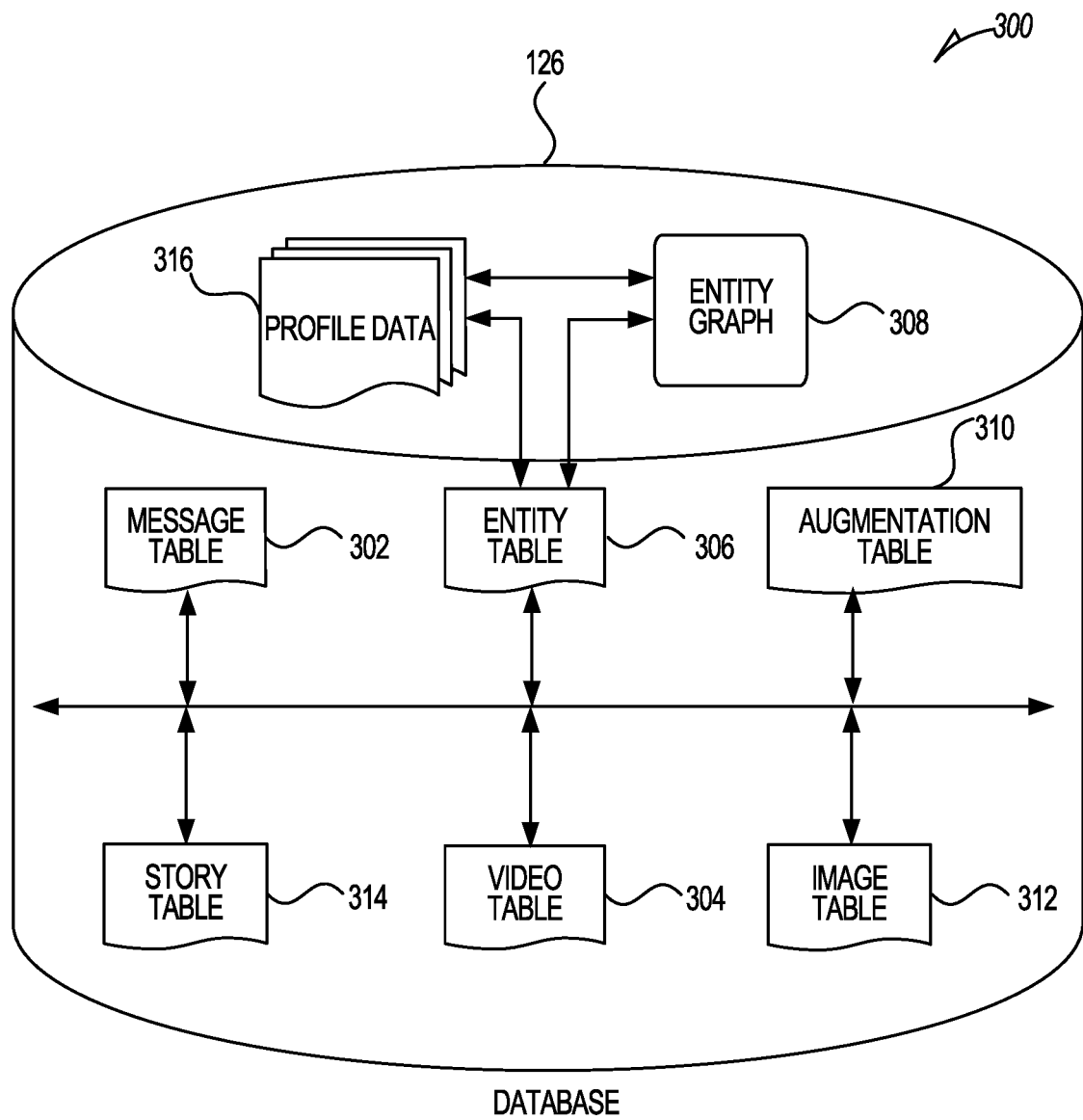
FIG. 3 is a diagrammatic representation of a data structure as maintained in a database, in accordance with some examples.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
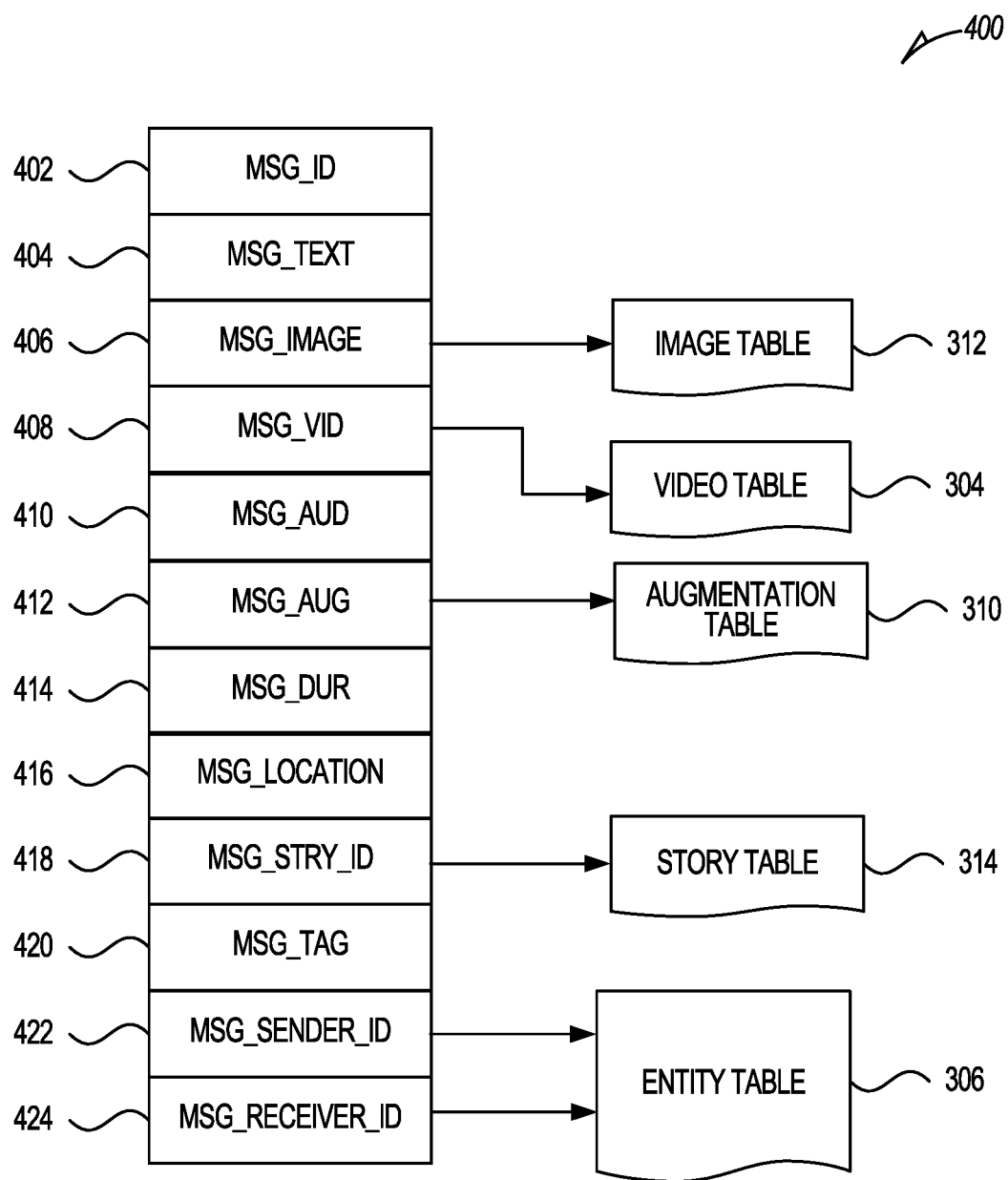
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
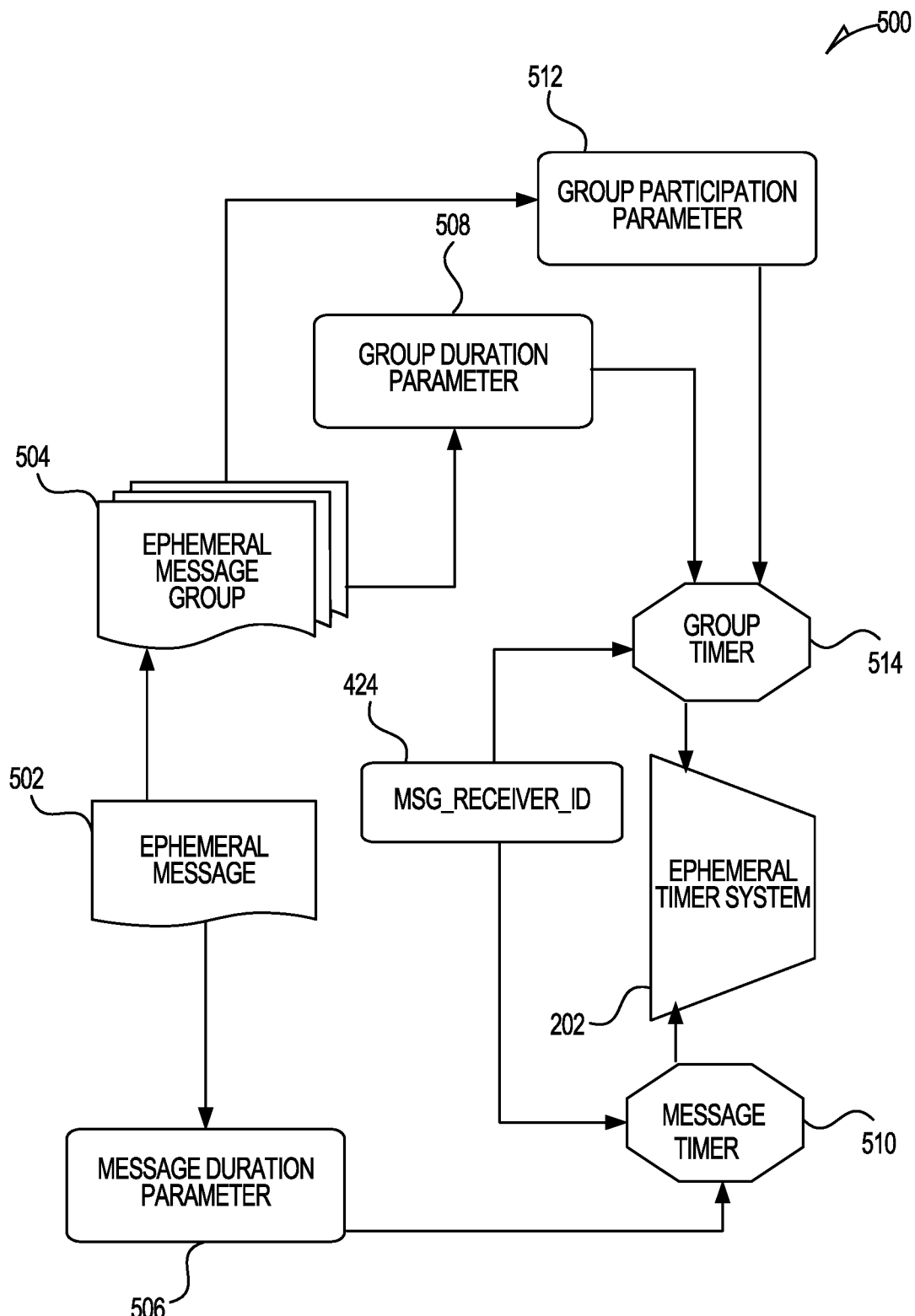
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Input Modalities for Ar Wearable Devices

Figure 6:
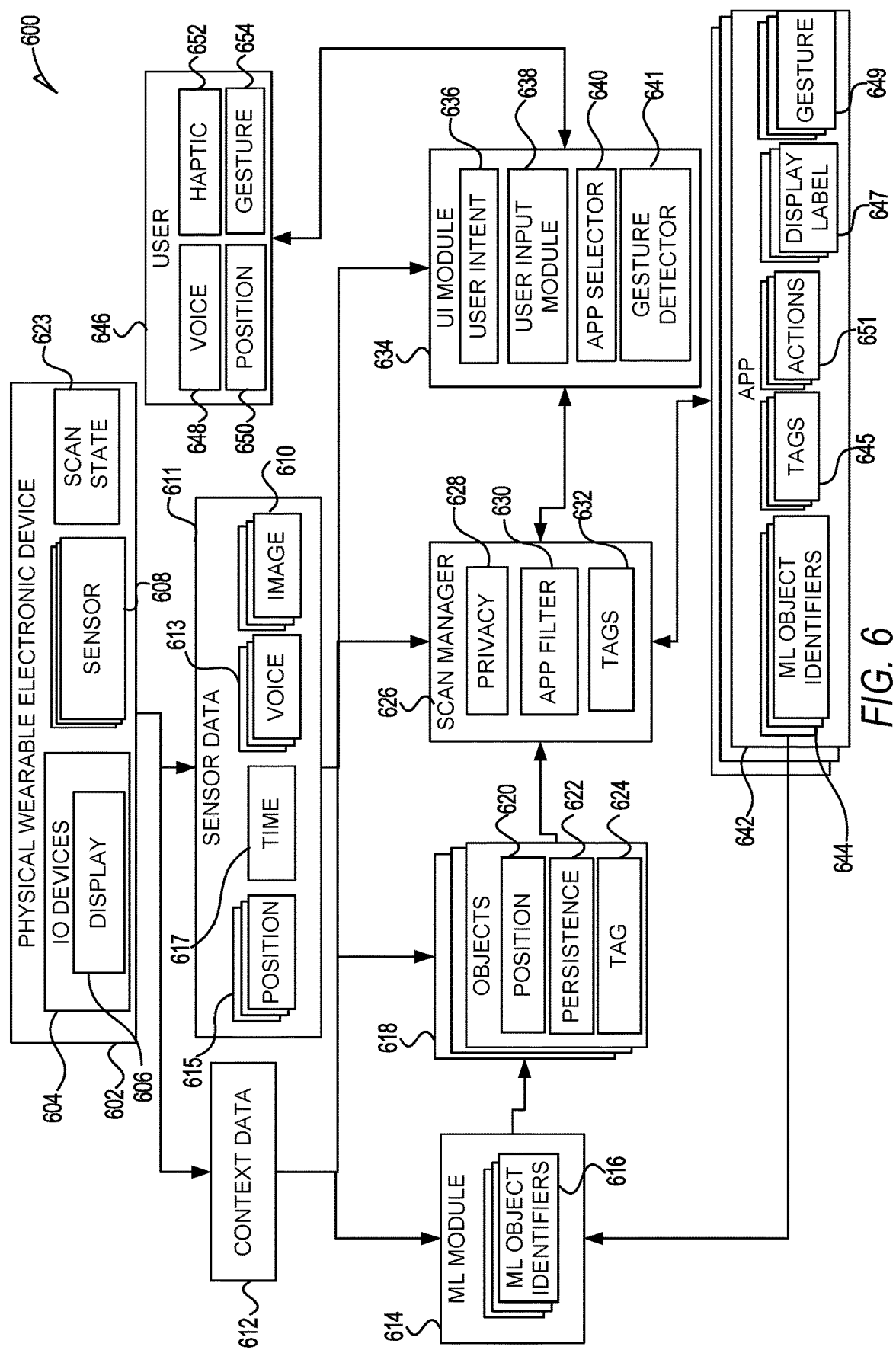
FIG. 6 illustrates a system for providing input modalities for AR wearable devices, in accordance with some examples.

FIG. 6 illustrates a system 600 for providing input modalities for AR wearable devices, in accordance with some examples. The system 600 includes AR wearable devices such as glasses 1000 of FIG. 1000 and may include other devices such as a portion of the messaging server system 108 that may perform one or more of the operations described herein.

The input/output (IO) devices 604 includes devices that enable a user 646 to receive output or send input to the system 600. The IO devices 604 include a display 606, a speaker, a microphone, a button, a touchpad, a gyroscope, and so forth. Some devices such as a gyroscope can be both a sensor 608 and an IO device 604 as by moving the system 600 the user 646 may communicate input to the system 600. However, the user 646 may move the system 600 without an intention to communicate input to the system 600. The sensors 608 includes a gyroscope, light sensor, an image sensor or camera, a positioning sensor, a clock, and so forth. The sensors 608 includes wireless communications, in accordance with some examples. Wireless communications such as LE Bluetooth can be used to determine a location and/or an orientation of the system 600 so the wireless communication may also be considered a sensor 608. The scan state 623 is stored in a memory of the system 600 and indicates whether the system 600 is in a visual scan mode where the system 600 scans sensor data 611 such as images 610 to detect objects 618 and offers the user 646 the opportunity to invoke applications (APPs) 642 associated with the objects 618. The visual scan mode is energy intensive and places a drain on the battery (not illustrated) of the system 600. So, it is desirable to lessen the amount of time the system 600 is in a visual scan mode.

The context data 612 includes data associated with the system 600 and user 646 such as a profile of the user or other users of the messaging system 100. In some examples, the context data 612 includes information available on the internet. The context data 612 includes information available from the physical wearable electronic device 602. The sensor data 611 includes position 615 data, time 617 data, voice 613 data, and image 610 data. The sensor data 611 is generated from the sensors 608 and IO devices 604. The display 606 is an electronic device for the visual presentation of data such as the visual presentation of app 642 activity for a user 646. The display 606 is optical elements 943, 944 of FIG. 9, in accordance with some examples.

In some examples, the user 646 is a user of the messaging system 100. The user 646 data structure has information associated with the user 646 such as a position 650. The user can input data using a voice 648, haptic 652 means, a gesture 654, which is where the user 646 performs some movement or sounds that can be interpreted as a gesture 654, or another way.

Figure 7:
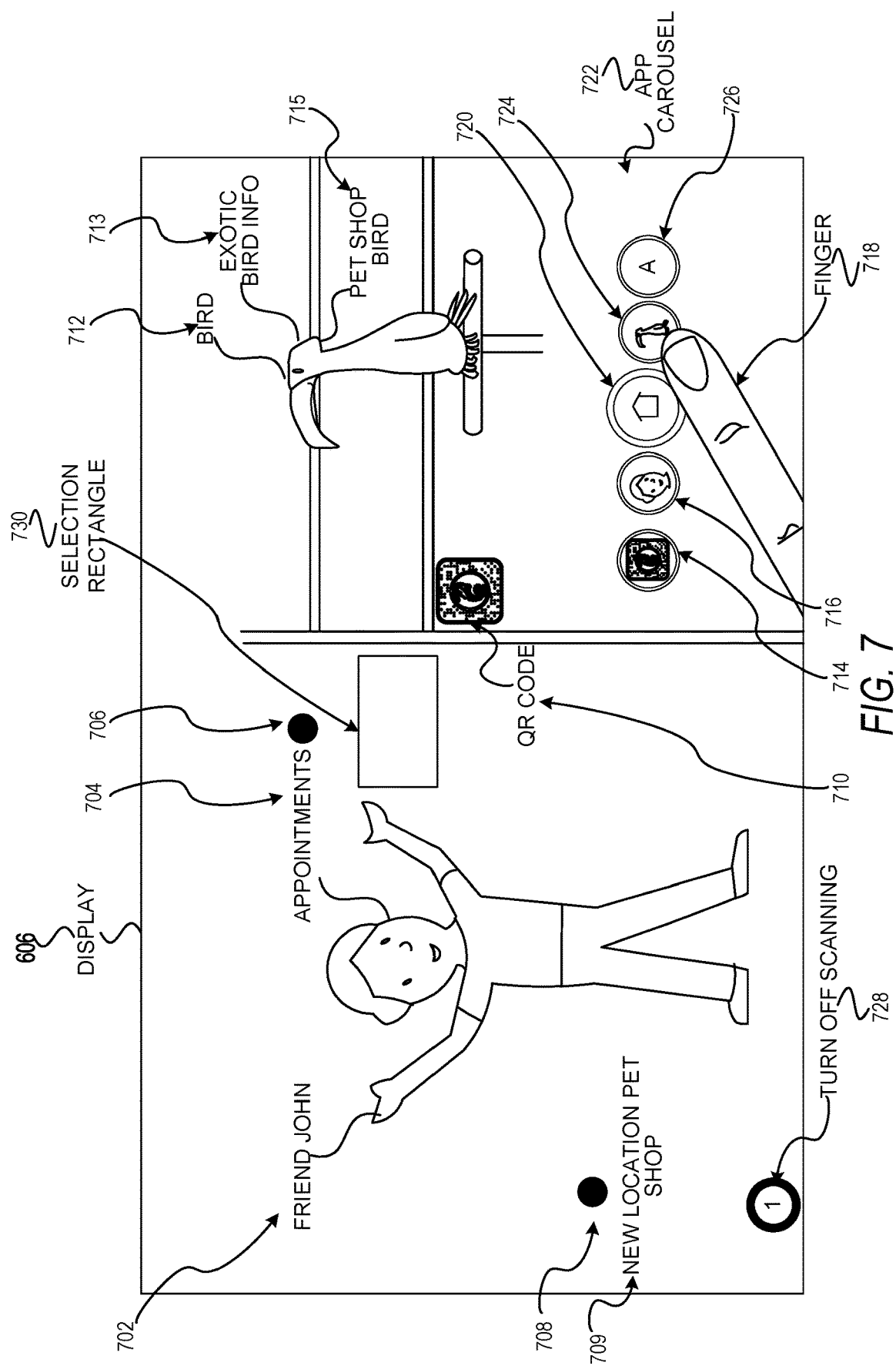
FIG. 7 illustrates the display of the system illustrated in FIG. 6, in accordance with some examples.

The machine learning (ML) module 614 receives sensor data 611 and processes the sensor data 611 to generate objects 618 with a position 620, a persistence 622, and a tag 624. For example, FIG. 7 is discussed in conjunction with FIG. 6. FIG. 7 illustrates the display 606 of the system 600. For example, a user may have walked into a new location pet shop 709 and ran into his friend John 702. The ML module 614 identifies objects 618, friend John 702, QR code 710, and bird 712. The ML module 614 determines that this is a new location pet shop 709 using the sensor data 611 and generates an object 618 that represents the new location pet shop 709. The tags 632, 624, and 645 are metadata associated with the scan manager 626, objects 624, and the apps 642, respectively, in accordance with some examples.

The ML module 614 uses ML object identifiers 616 to identify objects within the sensor data 6122. The ML object identifiers 616 include information necessary to identify an object within the sensor data 611 and indicate a tag 624 to associate with the object 618. In some examples, the ML object identifier 616 is a trained neural network that identifies one or more objects within an image. In some examples, the system 600 sends the sensor data 611 to a host computer to find the objects 618 within the sensor data.

The ML module 614 determines a position 620 of the object 618 within the image 610, a tag 624 that is associated with the object 618, and a persistence 622 associated with the object 618. The tag 624 indicates a name, description, or action to associate with the object 618. The tag 624 is used to associate an app 642 with the object 618 so that the user 646 can select the object 618 or tag 624 and activate the app 642. The tag 624 may also be used for displaying the indication of the app 642 on the display 606 such as "Friend John." The friend portion indicates that John is a friend within the messaging system 100. In some embodiments, the system 600 does not perform identification of people except for friends of the user. In some embodiments, the system 600 does not perform identification of any people. The persistence 622 data indicates a persistence of the object 618 within the sensor data 611. For example, persistence 622 may indicate that the object 618 has been present for a certain number of seconds or a certain number of captured images. In some embodiments, the scan manager 626 will ignore objects 618 unless they have a persistent 622 that indicates that the object 618 did not just appear in an image 610 during a quick turn of the user's head. For example, a persistence 622 value of 0.2 seconds may indicate that the user is likely stable in their head orientation.

The scan manager 626 module scans the app 642 and the objects 618 to find matches of the tags 624 of the objects 618 with the tags 645 of the apps 642. The app filter 630 module selects which apps 642 to present to the user. The app filter 630 module uses historical usage data, e.g., frequency of use, of the user (or other users) that is available from the context data 612 to select which apps 642 to present to the user. The app filter 630 module limits the number of apps 642 presented to the user 646 to a manageable number such as from one to twenty. The privacy 628 module filters any apps 642 that are determined not to be secure for the user 646 to run or, for which, to run the app 642 would require passing information regarding the user 646 or system 600 that violates security settings of the user 646 or the system 600. For example, the user 646 data may indicate a setting not to pass location information to an app 642 so the privacy 628 module filters the app 642 from being presented as an option for the user 646 if the app 642 requires location information.

The apps 642 may include an ML object identifier 644, which is information for the ML module 614 to identify an object and is associated with tags 645 that are to be associated with the object 618 if it is identified in the sensor data 611. Third parties such as the pet shop owner may register apps 642 with the system 600. The app filter 630 determines whether to consider the registered apps 642. When the system 600 starts or is turned-on, the scan manager 626, optionally, communicates with a host device such as client device 102 to download or select apps 642 to include in a memory of the system 600. The downloaded apps 642 are then considered for passing to the UI module 634. The apps 642 include actions 651 which are associated with procedures that are performed by the app 642 when an action 651 is selected. The actions 651 are displayed before the app 642 is invoked as an upper-level option for the user 646, in accordance with some examples. For example, referring to FIG. 7, if "Friend John" 702 is selected by the user, a menu may appear with actions 651 available for "Friend John" 702 such as "message", "remind me of his name", and so forth. In some embodiments, one or more of the actions 651 are displayed prior to any selections by the user. For example, with "Friend John" 702, the action 651 "Appointments" 704 is displayed, which indicates that there are appointments with John and a selection of "Appointments" 704 will tell the user when the appointments are. In some embodiments, if there is only one appointment, then the data and time will be displayed in the proximity of "Friend John" 702.

The scan manager 626 sends an indication of the apps 642 that the scan manager 626 selected for the UI module 634 to present to the user 646. The UI module 634 presents the apps 642 to the user 646. For example, referring to FIG. 7, "Friend John" 702, "appointments" 704, a graphic bullet 706, a "QR code" 720, "bird" 712, a graphic bullet 708, a "new location pet shop" 709, and a "1" 728 are presented on the display 604 for an AR experience for the user 646. Each of "Friend John" 702, "appointments" 704, "bird" 712, "QR code" 710, and "new location pet shop" 709 are associated with an app 642. The apps 642 include a display label 647, which for convenience is the same as the tag 645 for this example except for the tag 645 "bird" as discussed in conjunction with FIGS. 8 and 9. The apps 642 include a gesture 649, which, when present, is used by the gesture detector 641 to detect when the app 642 has been selected. The gesture detector 641 uses gesture 649 information associated with the app 642 in some examples. The gesture 649 can be used to limit which gestures 649 are available to the user 646 to select an app 642.

In some examples, to protect privacy, the privacy 628 module does not permit apps 642 that identify people. The app 642 associated with "Friend John" 702 is an app 642 for a camera to take picture of the person associated with "Friend John" 702. The app 642 associated with "appointments" 704 is an app 642 that reviews appointments that are scheduled with "Friend John" 702. The app 642 associated with "bird" 712 is an app 642 that provides information about the bird such as its name. The app 642 associated with "QR code" 710 is an app 642 that reads QR codes. The app 642 associated with the "new location pet shop" 709 is an app 642 provided by the pet shop that provides information about the pet shop.

The app carousel 722 is an alternative means of selecting and displaying which apps 642 are available. The apps 642 associated with the QR code 714, the "Friend John" 716, the pet shop 720, the bird 724, and the appointments 726 are available by selecting the icon displayed in the app carousel 722. The app carousel 722 is presented by the UI module 634. As illustrated the finger 718 of the user is hovering over the bird 724 icon. The app carousel 722 is part of the AR and the finger 718 is the actual finger 718 of the user with the user seeing the light reflecting from their finger 718.

The user input module 638 determines the input of the user 646 from the sensor data 611. For example, the user may provide input using their voice 648, moving their position 650 such as moving their head, using haptic 652 means such as using their fingers to touch a button or touchpad, using a gesture 654 such as waving a finger, and so forth. The finger 718 may be another appendage or an object such as a pencil that is controlled by the user. The user input module 638 determines which of the sensor data 611 is the input of the user 646 from all the sensor data 611. In some examples, the user input module 638 monitors the sensor data 611 for new sensor data 611 and evaluates or determines whether the new sensor data 611 should be considered as input from the user 646. The user intent module 636 determines the intent of the user. For example, there may be multiple interpretations of the user 646 input and the user intent 636 determines the intent of the user 646.

In one example, referring to FIG. 7, the user 646 moves their head so that the bird 712 becomes in the center of the display. The user input module 638 determines that the movement of the head to place one of the tags 645 of an app 642 in the center of the display 606 is an input. The UI module 634 receives multiple sensor data 611 such as images 610, which is used by the user intent module 636 to determine the user intent 636. The user intent module 636 determines that the intent of the user 646 was to invoke the app 642 for the bird 712 by moving the tag 645 to the center of the display 606. The app selector 640 indicates to the scan manager 626 the user intent 636 of the user 646. The scan manager 626 invokes the app 642 for the bird 712, which may provide the actions 651 available to the user 646. The scan manager 626 determines what data to pass to the app 642 such as an image 610, context data 612, and so forth. The app 642 for the bird 712 describes the type of bird and a price of the bird within the pet shop. The UI module 634 considers not only single instances of new sensor data 611, but also a series of sensor data 611 over time. In the example above, the UI module 634 receives multiple versions of the objects 618 with the position 620 of as the bird 712 becoming closer and closer to the center of the display 606. The bird 712 then remains in the center for a threshold period of time, which the user intent 636 module interprets to mean a selection of the bird 712.

In some examples, the text "bird" 712 changes as it becomes closer to being selected as the user intent 636 of the user 646. For example, as "bird" 712 gets closer to the center of the display 606 "bird" is bolded. In some examples, a selection rectangle 730 is presented as part of the AR and the user 646 then moves a tag 645 into the selection rectangle 730 for a threshold period of time for selection of the tag 645 such as the bird 712. In some examples, the selection rectangle 730 appears when the user intent 636 module determines that the user 646 is in the process of or trying to select a tag 645. In some examples, the selection rectangle 730 may indicate a secondary gesture 654 for the user 646 to perform to select a tag 645. For example, if a tag 645 is in the selection rectangle 730, then "select" is displayed on the display 606 with an indication for the user to move their head up and down to select the tag 645. The selection rectangle 730 may be another shape such as a polygon, circle, triangle, irregular shape, and so forth. The selection rectangle 730 is termed a selection shape, in some examples.

Figure 10:
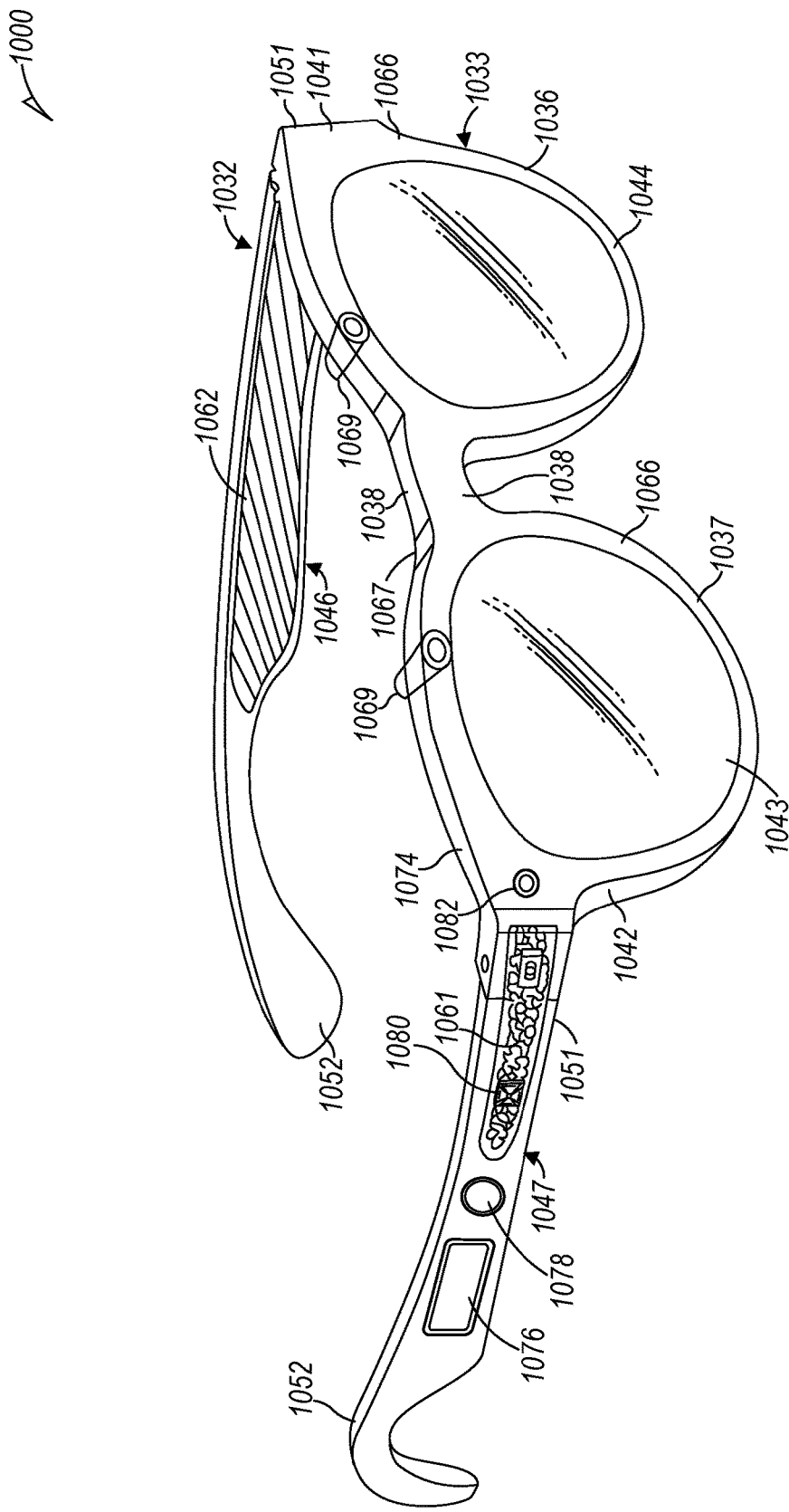
FIG. 10 illustrates examples of a wearable electronic device in the form of glasses, in accordance with some examples.

In some examples, the user 646 indicates a selection of a tag 645 by using their voice 648 to read the tag 645. For example, "1" may be selected by voicing "1". In some examples, the user 646 indicates a selection of a tag 645 by placing their finger 718 near the tag 645. In some examples, the UI module 634 presents a bullet 706 or another icon to indicate that an object 618 or action 651 does not have a physical example. In some embodiments, the UI module 634 presents the indication of the AR app 642 adjacent or near the object 618. For example, the indication of the AR app 642 for appointments 704 is the bullet 706 and not the "Friend John" 702. "New Location Pet Shop" 709 is an object 618 identified by the ML module 614 based on the position 615 that may have come from a GPS system, information from a host device, a QR code, an object identification in the image 610, or another source. The "New Location Pet Shop" 709 is treated like an object 618 with a tag 624 of "New Location Pet Shop". An object 618 such as the pet shop can be identified based on a location of the physical wearable electronic device 602. The system 600 may query the host device such as client device 102 for an app 642 associated with the object 618 "New Location Pet Shop." The bullet 708 is used as the position of the object 618 "New Location Pet Shop" for the purposes of the user 646 selecting the object 618. The "turn off scanning" 728 enables the user 646 to turn off or on the scan state 623. In some examples, the indication of the app 642 is presented by changing the object 618 rather than presenting the tag 645. For example, rather than presenting "Bird" 712, the bird itself is changed to indicate that the bird may be selected. For example, the bird may be highlighted, made to blink, or changed in another way. The scan state 623 may be turned on and off in various ways such as using a button or touchpad as illustrated in FIG. 10. In some embodiments, the scan state 623 is turned off when the scan manager 626 invokes an app 642. The term "presenting" is used for displaying data on the display 606; however, one skilled in the art would recognize that other terms may be used or applicable such as rendering, outputting, and so forth.

Figure 8:
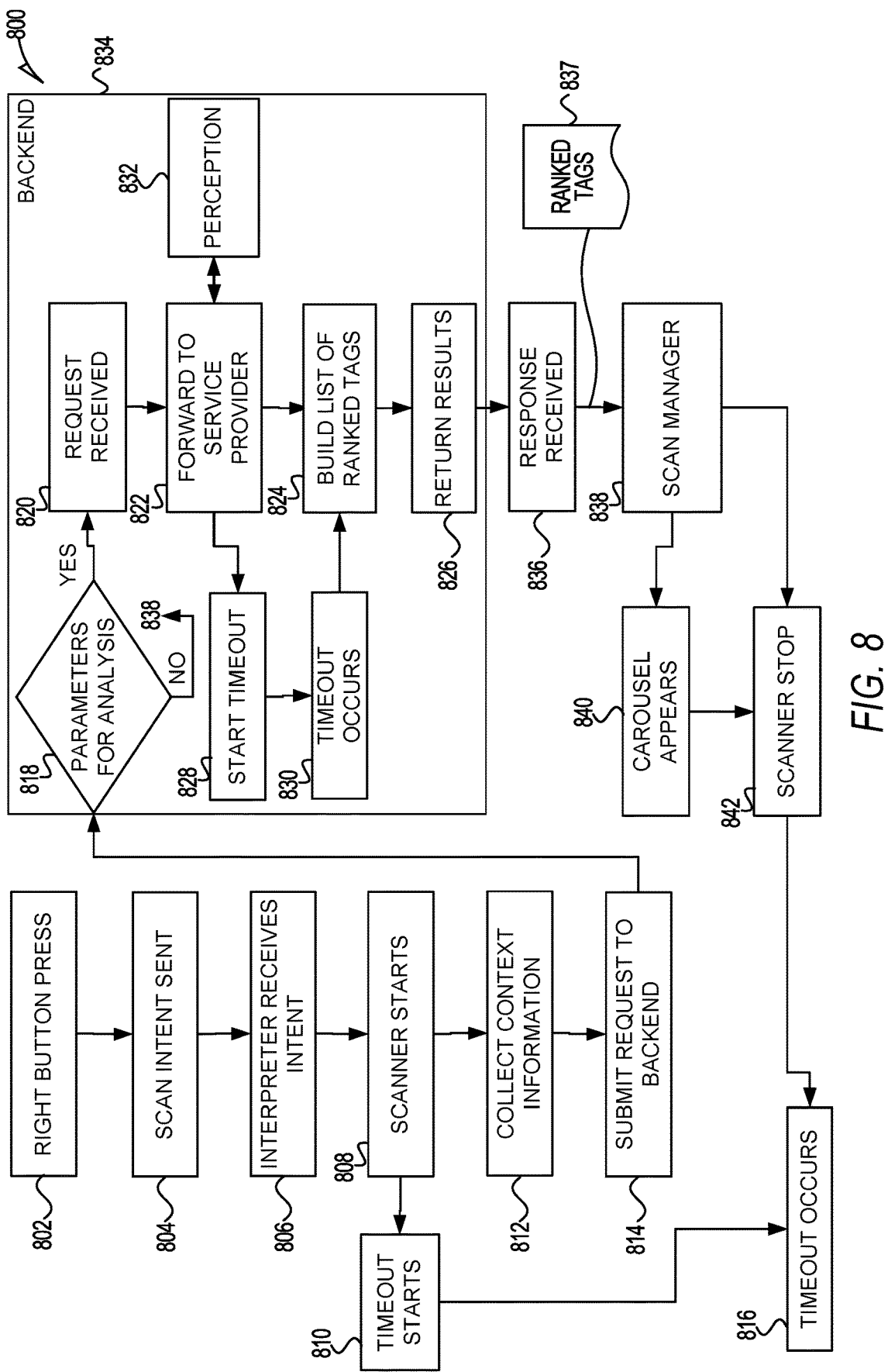
FIG. 8 illustrates a method for input modalities for AR wearable devices, in accordance with some examples.
Figure 9:
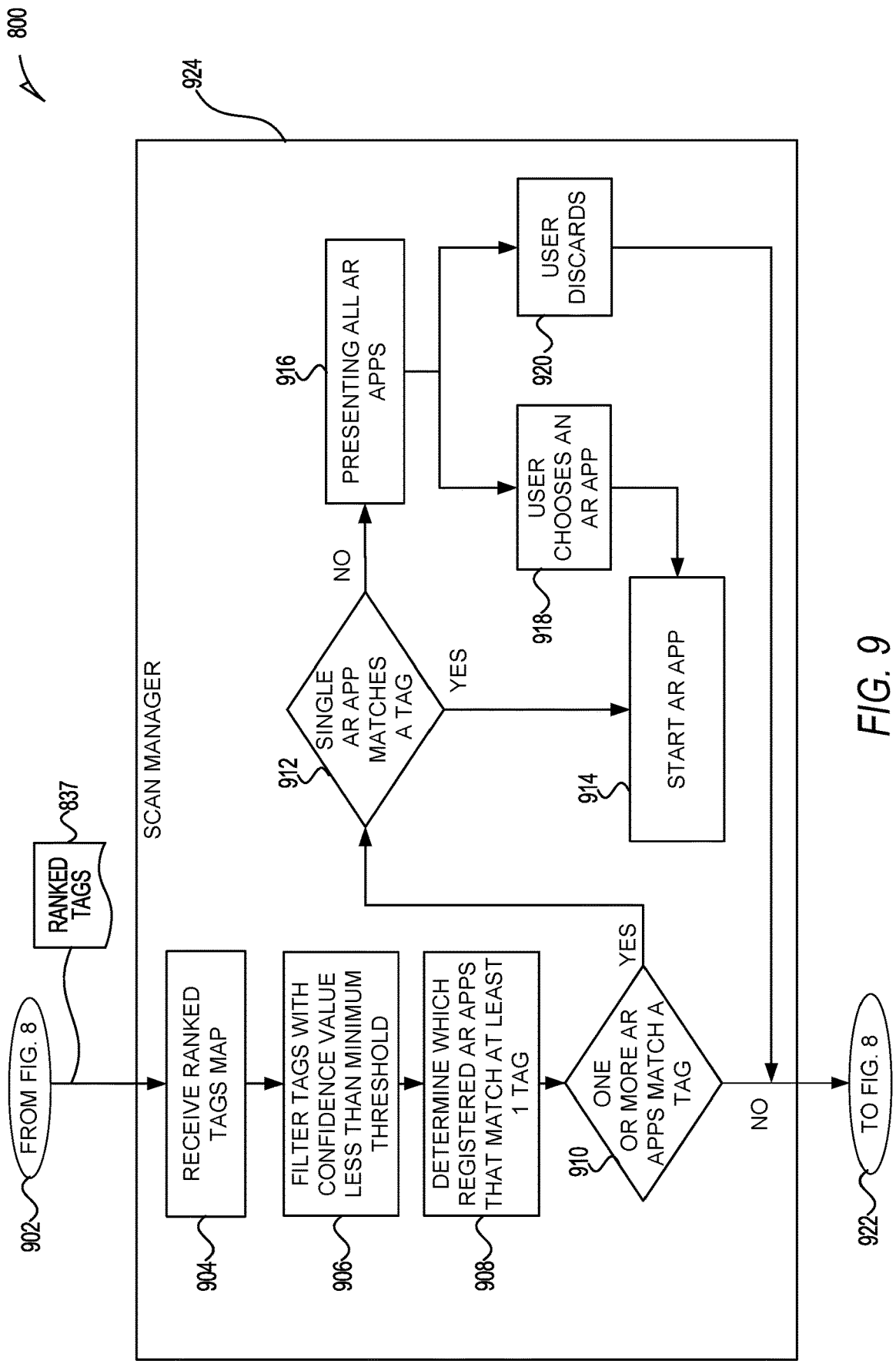
FIG. 9 illustrates a continuation of the method for input modalities for AR wearable devices, in accordance with some examples.

FIGS. 8 and 9 are described in conjunction with one another. FIG. 8 illustrates a method 800 for input modalities for AR wearable devices, in accordance with some examples. FIG. 9 illustrates a continuation of the method 800 for input modalities for AR wearable devices, in accordance with some examples. The method 800 is embodied by AR wearable devices such as glasses 1000 of FIG. 10. The method 800 starts at operation 802 with a right button press. For example, the user 646 may use an IO device 604 such as a button 1078 of FIG. 10. The method 800 continues at operation 804 with scan intent sent. For example, the IO device 604 sends a signal to an interpreter module (not illustrated) that runs or executes the various modules illustrated in FIG. 6. The method 800 continues at operation 806 with the interpreter receiving the intent. The interpreter module receives the signal to begin the scan. The interpreter module sets the scan state 623 to indicate that a scan state is entered.

The method 800 continues at operation 808 with the scanner starting. For example, the interpreter module causes the physical wearable electronic device 602 to collect data such as images 610 or, in some examples, a single image 610, which may be part of a power efficient state. The method 800 continues at operation 810 with a timeout starting 810. For example, the interpreter module waits for the physical wearable electronic device 602 to provide sensor data 611. The method 800 continues at operation 816 with a timeout occurring. For example, if there are difficulties collecting data with the physical wearable electronic device 602, then a timeout may occur. The interpreter module or system 600 may return to a state associated with operation 802 or may attempt to collect sensor data 611 again.

The method 800 continues at operation 808 with the scanner starting. For example, the scanner is an image capturing device that captures an image 610. The method 800 continues at operation 812 with collecting context information. For example, context data 612 and other sensor data 611 is collected. The method 800 continues at operation 814 with submitting request to the backend 834. For example, the IO devices 604 include wireless connections to a host such as the client device 102. The sensor data 611 and context data 612 is submitted to the backend 834.

The method 800 continues at operation 818 determining whether there are parameters for analysis? The parameters indicate different ways in which the sensor data 611 and context data 612 is analyzed. For example, as illustrated, the "yes" indicates that the perception 832 server should be used to analyze the sensor data 611 and context data 612 and the "no" indicates that a local ML module 614 should be used to analyze the sensor data 611 and context data 612. The perception 832 server is the input modalities server 124 of the input modalities system 216, in accordance with some examples.

The method 800 continues at operation 820 with request received, which indicates the backend has received the request. The method 800 continues at operation 822 with forwarding to a service provider. For example, the service provider may be perception 832 server, which is indicated at operation perception 832. The method 800 continues at operation 824 with building a list of ranked tags 837. For example, the backend 834 builds a set of objects 618 that include tags 624 with a ranking.

The forwarding to a service provider 822 may include operations 828 and 830 where a timeout can occur in sending the sensor data 611 and context data 612 to the service provider. The default is to build a list of ranked tags with what information is available.

The method 800 continues at operation 826 with returning results 826. For example, the backend 834 sends the results via a wireless connection to the system 600. The method 800 continues at operation 836 with response received. For example, the system 600 receives the ranked tags 837. The method 800 continues at operation 838 with the scan manager performing operations. For example, the operations of the scan manager 838 are illustrated in FIG. 9 and described in conjunction with FIGS. 6 and 7 where scan manager 838 is an example of scan manager 626. In some examples, the method 800 continues with the carousel appearing 840. For example, an app carousel 722 may appear rather than or in conjunction with the tags 645 as illustrated in FIG. 7. The method 800 continues with the scanner stopping 842. For example, the scanner may timeout, stop after an app is run, or stop when the user 646 determines to stop the scanner. The scan state 623 is changed to indicate that scanning is no longer to be performed.

The method 800 continues at operation 838 with the operation of the scan manager 924. The method 800 continues from FIG. 8 to FIG. 9 at operation 902. The ranked tags 837 are passed to the scan manager 924. In some examples, the scan manager 924 is the same or similar as scan manager 626.

The method 800 continues at operation 904 with receiving ranked tags 837. For example, the scan manager 924 receives objects 618, which may be both from the backend 834 and from ML module 614. The ranked tags 837 are an example of the objects 618, in accordance with some examples. The method 800 continues at operation 906 with filtering tags with confidence value less than a minimum threshold. The tags 624 are associated with a confidence value (not illustrated). The confidence value indicates a confidence that the tag 624 is relevant to the object 618 or that the tag 624 would be of interest to the user 646. The scan manager 924 removes tags 624 with an associated confidence value that is below a threshold value of confidence. The method 800 continues at operation 908 with determining which registered AR apps match at least one tag 624. For example, the scan manager 626 looks for apps 642 that include tags 645 that match tags 624.

The method 800 continues at operation 910 with determining whether one or more AR apps match a tag. For example, if there are not any apps 642 with tags 645 that match the tags 624, then the method 800 returns to FIG. 8 at operation 842 the canner stopping 842. If there are AR apps with tags 645 that match the tag 624, then the method 800 continues at operation 912 with determining whether a single AR app matches a tag. If only a single AR app's tag 645 matches a tag 624, then the method 800 continues at operation 912 with starting the AR app. For example, scan manager 626 starts the app 642 and passes the context data 612 and sensor data 611 to the app 642 based on the privacy 628 settings.

If there are more than one apps with tags 645 that match the tag 624, then the method 800 continues at operation 916 with presenting all the AR apps. For example, scan manager 626 causes the UI module 634 to display three different apps 642 for the tag "bird" for the object 618 that is a bird in FIG. 7. For example, the following is three different apps 642 and how they would be displayed by the UI module 634. A first app 642 that is associated with the tag 645 "bird" and has a display label 647 of "bird" is displayed on top. A second app 642 that is associated with the tag "bird" and has a display label 647 for the app 642 of "exotic bird info" 713 is displayed. A third app 642 that is associated with the tag "bird" and has a display label 647 for the app 642 of "pet shop bird" 715 is displayed. All three of the apps 642 invoke different functionality or procedures.

The method 800 continues at operation 918 with the user choosing an AR app. For example, the UI module 634 may determine that a user 646 has selected an app 642. The method 800 then continues at operation 914 starting the AR app. For example, the scan manager 626 starts the app 642 and determines what to pass the app 642 in accordance with the privacy 628 module. For example, the privacy 628 module may determine based on privacy setting not to pass a position 615 or location of the user 646. The method 800 continues at operation 920 with the user discarding the AR app or AR apps presented. For example, the user 646 determines not to select an app 642. The method 800 continues at operation 922 with returning to FIG. 8 to operation 842 with the scanner stopping where the system 600 turns off the scan state 623.

FIG. 10 illustrates examples of a wearable electronic device in the form of glasses 1000, in accordance with some examples. The wearable electronic device in the form of glasses 1000. The glasses 1000 are an article of eyewear constituted by electronics, which operate within a network system for communicating image and video content. FIG. 10 illustrates a front perspective view of the glasses 1000. In some examples, the wearable electronic device is termed AR glasses. The glasses 1000 can include a frame 1032 made from any suitable material such as plastic or metal, including any suitable shape memory alloy. The frame 1032 can have a front piece 1033 that can include a first or left lens, display, or optical element holder 1036 and a second or right lens, display, or optical element holder 1037 connected by a bridge 1038. The front piece 1033 additionally includes a left end portion 1041 and a right end portion 1042. A first or left optical element 1044 and a second or right optical element 1043 can be provided within respective left and right optical element holders 1036, 1037. Each of the optical elements 1043, 1044 can be a lens, a display, a display assembly, or a combination of the foregoing. The optical elements 1043, 1044 may be one optical element. In some examples, for example, the glasses 1000 are provided with an integrated near-eye display mechanism that enables, for example, display to the user of preview images for visual media captured by cameras 1069 of the glasses 1000.

The frame 1032 additionally includes a left arm or temple piece 1046 and a right arm or temple piece 1047 coupled to the respective left and right end portions 1041, 1042 of the front piece 1033 by any suitable means such as a hinge (not shown), so as to be coupled to the front piece 1033, or rigidly or fixedly secured to the front piece 1033 so as to be integral with the front piece 1033. Each of the temple pieces 1046 and 1047 can include a first portion 1051 that is coupled to the respective end portion 1041 or 1042 of the front piece 1033 and any suitable second portion 1052, such as a curved or arcuate piece, for coupling to the ear of the user. In one example, the front piece 1033 can be formed from a single piece of material, so as to have a unitary or integral construction. In one example, the entire frame 1032 can be formed from a single piece of material so as to have a unitary or integral construction.

The glasses 1000 include a computing device, such as a computer 1061, which can be of any suitable type so as to be carried by the frame 1032 and, in one example of a suitable size and shape, so as to be at least partially disposed in one or more of the temple pieces 1046 and 1047. In one example, the computer 1061 has a size and shape similar to the size and shape of one of the temple pieces 1046, 1047 and is thus disposed almost entirely if not entirely within the structure and confines of such temple pieces 1046 and 1047.

In one example, the computer 1061 can be disposed in both of the temple pieces 1046, 1047. The computer 1061 can include one or more processors with memory, wireless communication circuitry, and a power source. The computer 1061 comprises low-power circuitry, high-speed circuitry, location circuitry, and a display processor. Various other examples may include these elements in different configurations or integrated together in different ways. Additional details of aspects of the computer 1061 may be implemented as described with reference to the description that follows.

The computer 1061 additionally includes a battery 1062 or other suitable portable power supply. In one example, the battery 1062 is disposed in one of the temple pieces 1046 or 1047. In the glasses 1000 shown in FIG. 10, the battery 1062 is shown as being disposed in the left temple piece 1046 and electrically coupled using a connection 1074 to the remainder of the computer 1061 disposed in the right temple piece 1047. One or more input and output devices can include a connector or port (not shown) suitable for charging a battery 1062 accessible from the outside of the frame 1032, a wireless receiver, transmitter, or transceiver (not shown), or a combination of such devices.

The computer 1061 additionally includes a gyroscope 1080 or other suitable motion detector. In one example, the gyroscope 1080 is disposed in one of the temple pieces 1046 or 1047. In the glasses 1000 shown in FIG. 10, the gyroscope 1080 is shown as being disposed in the right temple piece 1047 and electrically coupled using a connection to the remainder of the computer 1061.

The glasses 1000 include digital cameras 1069. Although two cameras 1069 are depicted, other examples contemplate the use of a single or additional (i.e., more than two) cameras 1069. For ease of description, various features relating to the cameras 1069 will be described further with reference to only a single camera 1069, but it will be appreciated that these features can apply, in suitable examples, to multiple cameras 1069.

In various examples, the glasses 1000 may include any number of input sensors or peripheral devices in addition to the cameras 1069. The front piece 1033 is provided with an outward-facing, forward-facing, front, or outer surface 1066 that faces forward or away from the user when the glasses 1000 are mounted on the face of the user, and an opposite inward-facing, rearward-facing, rear, or inner surface 1067 that faces the face of the user when the glasses 1000 are mounted on the face of the user. Such sensors can include inward-facing video sensors or digital imaging modules such as cameras 1069 that can be mounted on or provided within the inner surface 1067 of the front piece 1033 or elsewhere on the frame 1032 so as to be facing the user, and outward-facing video sensors or digital imaging modules such as the cameras 1069 that can be mounted on or provided with the outer surface 1066 of the front piece 1033 or elsewhere on the frame 1032 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1043, 1044 (or lenses) to provide a mixed reality or augmented reality experience for the user of the glasses 1000.

The glasses 1000 further include an example of a camera control mechanism or user input mechanism comprising a camera control button mounted on the frame 1032 for haptic or manual engagement by the user. The camera control button provides a bi-modal or single-action mechanism in that it is disposable by the user between only two conditions, namely an engaged condition and a disengaged condition. In this example, the camera control button is a pushbutton that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1032 adjacent to its surface for detecting the presence of a user's finger, to dispose the touch-sensitive button to the engaged condition when the user touches a finger to the corresponding spot on the outer surface 1066 of the frame 1032. It will be appreciated that the above-described camera control button and capacitive touch button are but two examples of a haptic input mechanism for single-action control of the camera 1069, and that other examples may employ different single-action haptic control arrangements.

The glasses further include an input button 1078 where the computer 1061 is configured to recognize the depression of the button 1078 and may distinguish between short presses and long presses. The glasses further include a touchpad 1076 where the computer 1061 is configured to recognize the touching of the touchpad 1076 and may be configured to recognize different types of touching such as a long stroke, a short stroke, a touch, and so forth.

The computer 1061 is configured to perform the methods described herein. In some examples, the computer 1061 is coupled to one or more antennas for reception of signals from a GNSS, local area network, 3GPP network, or another type of network, and circuitry for processing the signals where the antennas and circuitry are housed in the glasses 1000. In some examples, the computer 1061 is coupled to one or more wireless antennas and circuitry for transmitting and receiving wireless signals where the antennas and circuitry are housed in the glasses 1000. In some examples, there are multiple sets of antennas and circuitry housed in the glasses 1000. In some examples, the antennas and circuitry are configured to operate in accordance with a communication protocol such as Bluetooth™, Low-energy Bluetooth™ IEEE 802, IEEE 802.11, and so forth. In some examples, PDR sensors housed in glasses 1000 and coupled to the computer 1061. In some examples, the glasses 1000 are VR headsets where optical elements 1043, 1044 are opaque screens for displaying images to a user of the VR headset. The glasses 1000 include one or more microphones 1082, in accordance with some examples.

Figure 11:
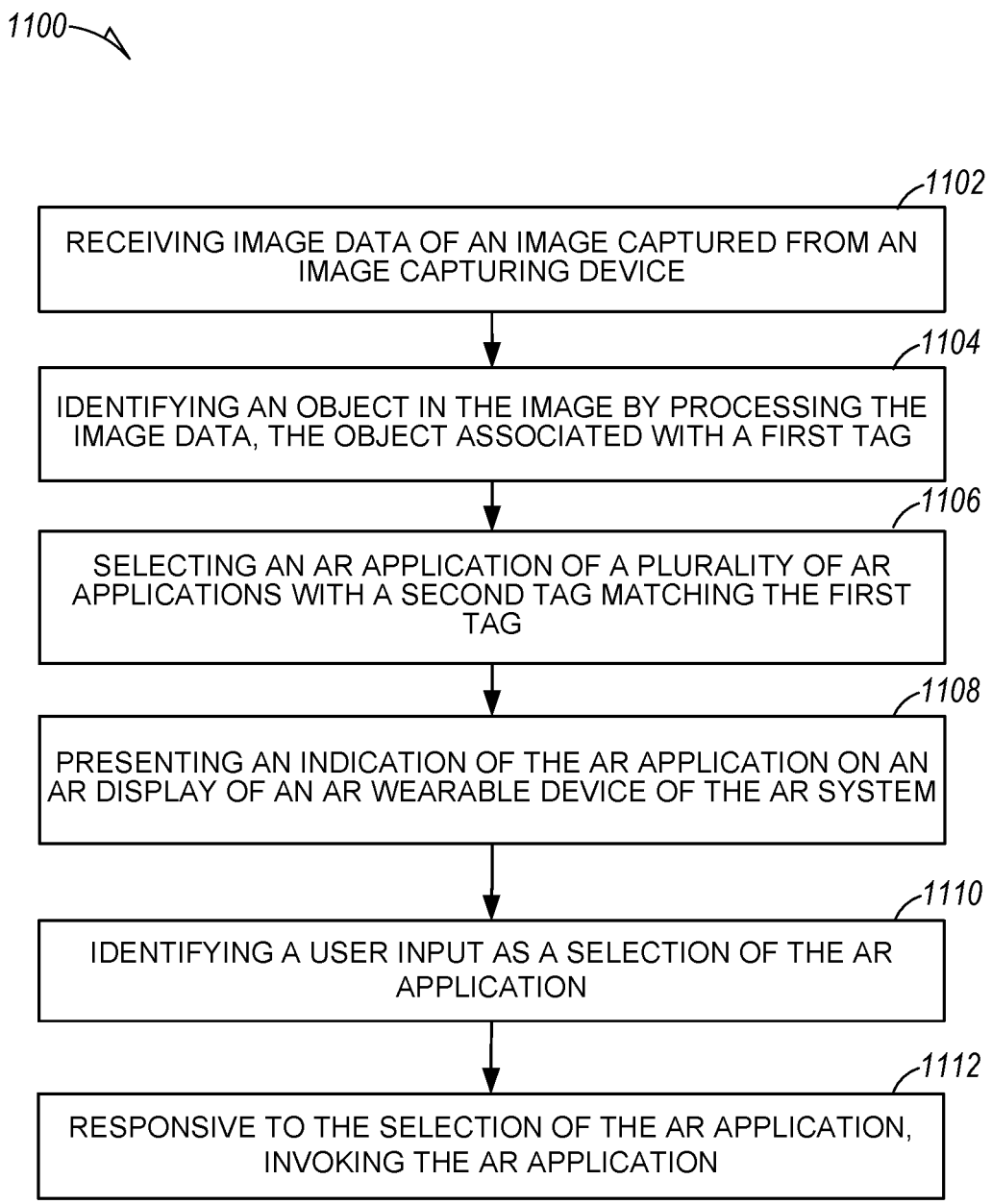
FIG. 11 illustrates a method for providing multiple input modalities for AR wearable devices, in accordance with some examples.

FIG. 11 illustrates a method 1100 for input modalities for AR wearable devices, in accordance with some examples. The method 1100 begins at operation 1102 with receiving image data of an image captured from an image capturing device. For example, the sensors 608 includes an image capturing device such as a camera type of device. The scan manager 626 module or another module receives image data of an image 610 captured from an image capturing device.

The method 1100 continues at operation 1104 with identifying an object in the image by processing the image data, the object associated with a first tag. For example, the ML module 614 identifies one or more objects within the image 610 by processing the image 610. The ML module 614 uses ML object identifiers 616 and ML object identifiers 644 to identify the objects 618. The ML object identifiers 616 are neural networks trained to identify one or more objects 618 within an image 610. Alternatively, as discussed in conjunction with FIGS. 8 and 9, the image 610 may be sent to a backend 834 for processing.

The method 1100 continues at operation 1106 with selecting an AR application of a plurality of AR applications with a second tag matching the first tag. For example, the scan manager 626 module may match tags 632 associated with the objects 618 with tags 645 associated with the apps 642. Additionally, the scan manager 626 module filters or selects the apps 642 to a presentable number such as 1 to 15 so that the number of options for the user 646 is manageable to enable easier selection of an app 642.

The method 1100 continues at operation 1108 with presenting an indication of the AR application on an AR display of an AR wearable device of the AR system. For example, UI module 634 presents indications of AR applications on the display 606 illustrated in FIG. 7. The indications may be words such as "bird" 712, icons, tags 645, display labels 647, or another indication that an AR application 642 is available that is associated with the object 618 that is visible to the user 646. In some examples, an object 618 may not be a physical object but an event such as that the GPS data indicates that the user 646 is in a new physical location such as a "new location pet shop" 709. However, the pet shop itself may be considered the object 618.

The method 1100 continues at operation 1110 with identifying a user input as a selection of the AR application. For example, the UI module 634 identifies a user intent 636 that the user wants to invoke an app 642 that is indicated on the display 606. Examples of the indications are the user 646 saying a label such as "1" 728 or the user 646 may move their head so that the indication such as "bird" 712 is within the selection rectangle 730. The method 1100 continues at operation 1112 with responsive to the selection of the AR application, invoking the AR application. For example, the scan manager 626 invokes app 642 in accordance with privacy 628 module in response to a selection of app 643 by the user 646.

When the scan manager 626 invokes the app 642, the scan manager 626 may include parameters or data such as an indication of the object and an indication of the position of the object within the image. The scan manager 626 may include other data such as objects 618, sensor data 611, context data 612, one or more of the scanned images, and so forth. In some embodiments, the app 642 access the data via a shared memory. For example, the object 618 and the position of the object 618 associated with the selected indication of the AR application may be in a shared memory that both the scan manager 626 and the app 642 can access.

The method 1100 may include one or more additional operations. Operations of method 1100 may be performed in a different order. One or more of the operations of method 1100 may be optional. The method 1100 may be performed by the client device 102, system 600, glasses 900, or another electronic device. Portions of the functionality may be performed on a server computer or host computer. For example, glasses 900 may be coupled to a host client device 102 or application server 114 where one or more of the operations are performed.

Machine Architecture

Figure 12:
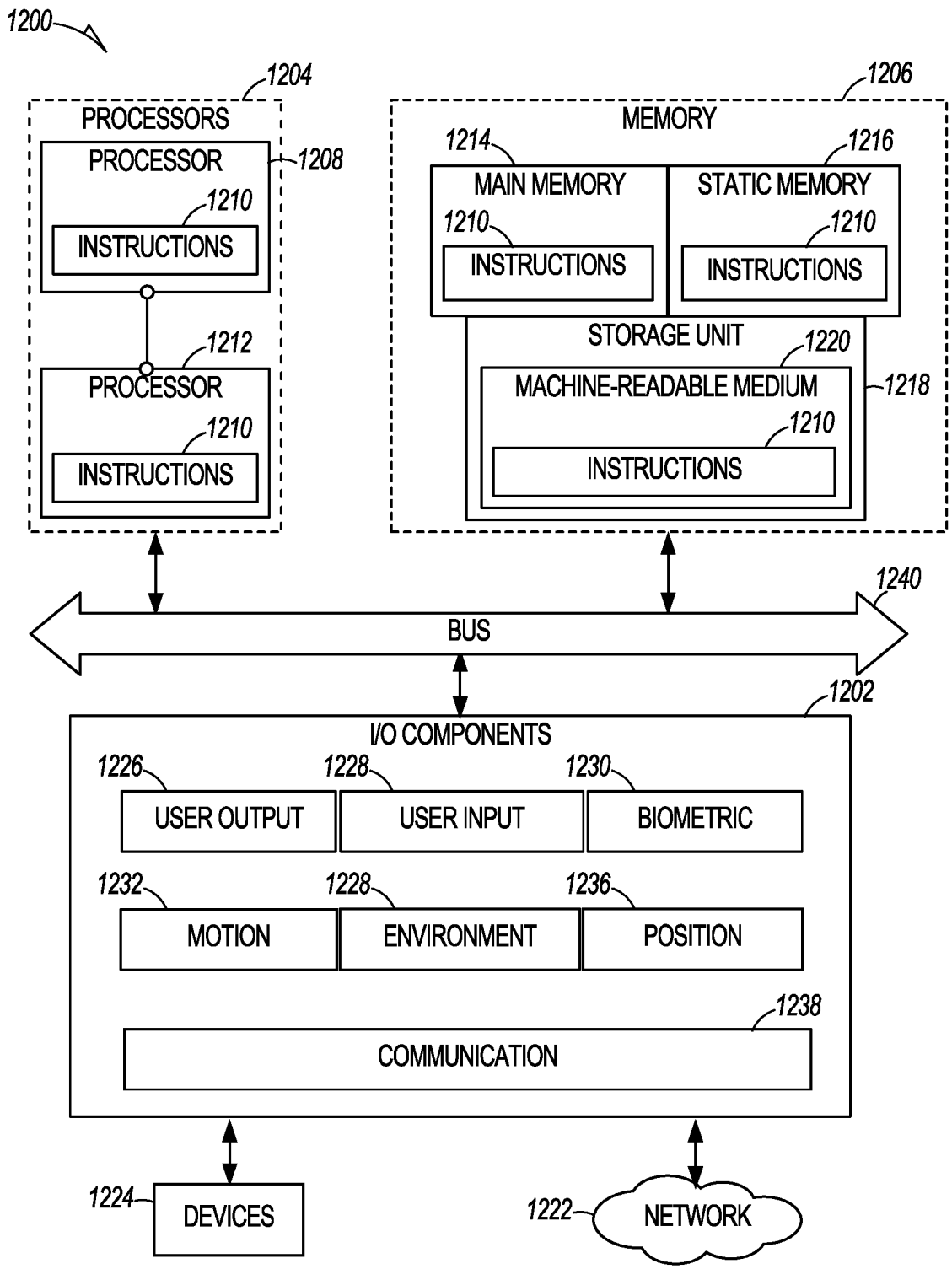
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
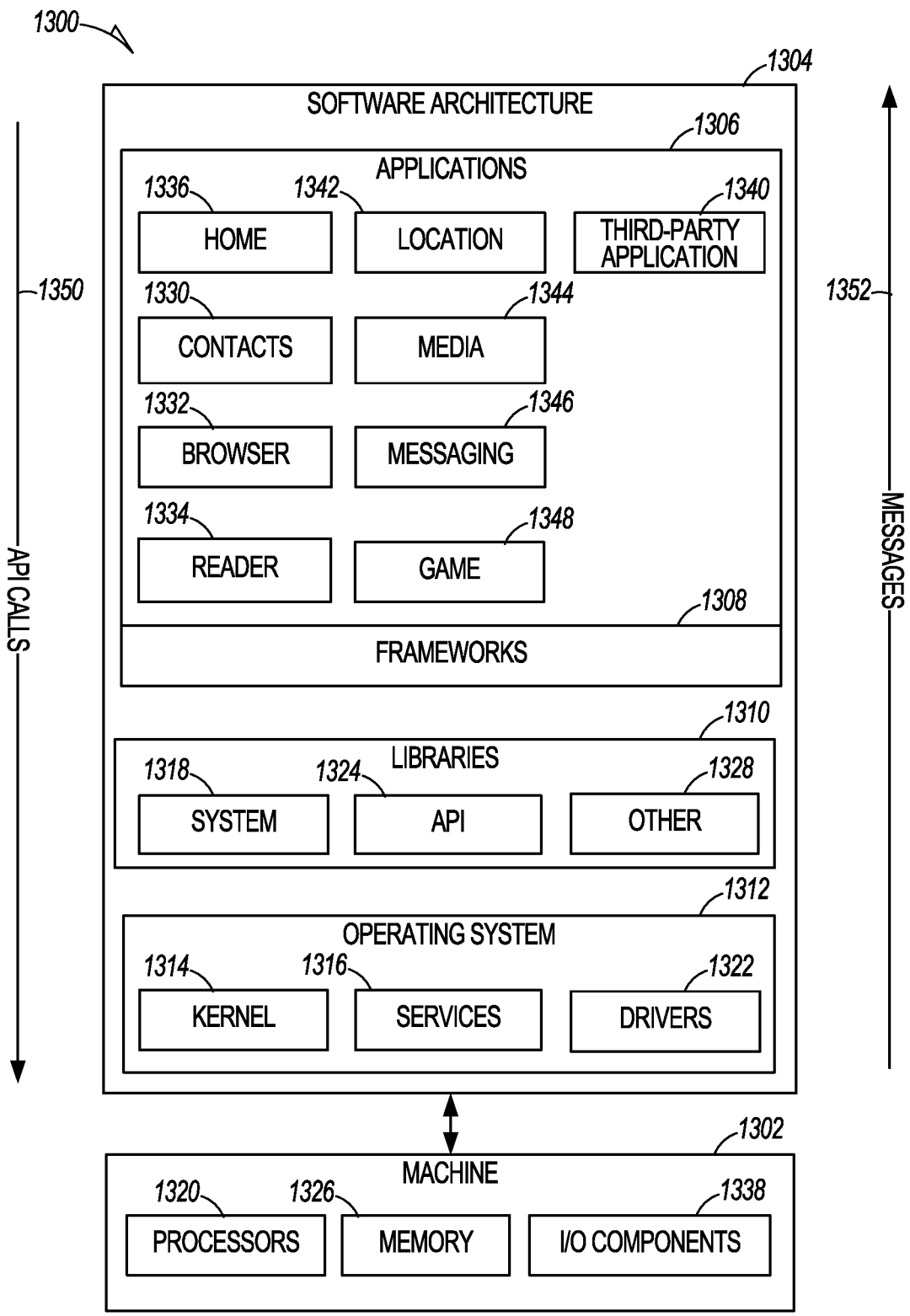
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Processing Components

Figure 14:
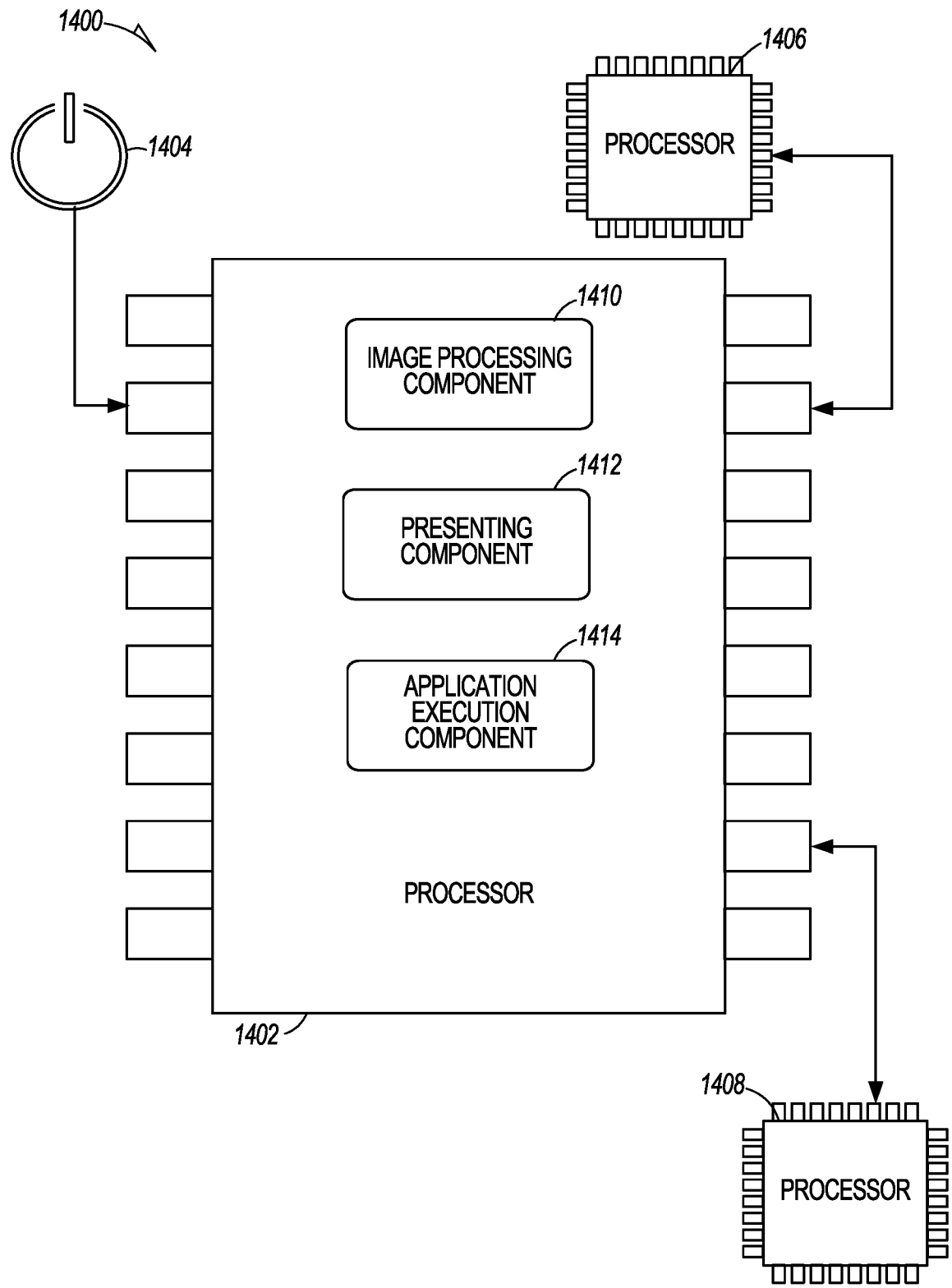
FIG. 14 is a diagrammatic representation of a processing environment, in accordance with some examples.

Turning now to FIG. 14, there is shown a diagrammatic representation of a processing environment 1400, which includes a processor 1402, a processor 1406, and a processor 1408 (e.g., a GPU, CPU or combination thereof).

The processor 1402 is shown to be coupled to a power source 1404, and to include (either permanently configured or temporarily instantiated) modules, namely an image processing component 1410, a presenting component 1412, and an application execution component 1414. The image processing component 1410 is invoked to process sensor data 611. An example of the image processing component 1410 is ML module 614 of FIG. 6. The presenting component 1412 presents indications of AR applications on a display of an AR wearable device. An example of the presenting component 1412 is the UI module 634 of FIG. 6.

The application execution component 1414 invokes the AR apps 642 when the user 646 selects the AR apps 642. An example of the application execution component 1414 is scan manager 626 of FIG. 6. The scan state 623 and other data may be in the memory associated with the processor 1402. As illustrated, the processor 1402 is communicatively coupled to both the processor 1406 and the processor 1408.

GLOSSARY

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on an augmented reality (AR) system, the method comprising:
   registering a plurality of AR applications, each of the plurality of AR application associated with one or more tags of a plurality of tags;
   receiving image data of an image captured from an image capturing device;
   identifying an object in the image by processing the image data, the object associated with a first tag of the plurality of tags;
   matching the first tag with the one or more tags associated with each of the plurality of AR applications to generate a list of matching AR applications;
   presenting an indication of the list of matching AR applications on an AR display of an AR wearable device of the AR system;
   identifying a user input as a selection of an AR application, of the list of matching AR applications, the AR application associated with a second tag matching the first tag; and
   responsive to the selection of the AR application, invoking the AR application.

2. The method of claim 1 further comprising:
   identifying the object using a neural network trained to identify the object.

3. The method of claim 1 further comprising:
   processing the image using a plurality of neural networks associated with the plurality of AR applications, the plurality of neural networks trained to identify objects associated with tags matching tags of the plurality of AR applications.

4. The method of claim 1 further comprising:
   sending the image with an instruction for the image to be processed across a wireless connection to a host computer; and
   receiving an indication of the object from the host computer.

5. The method of claim 1 wherein the indication of the AR application comprises an icon and text, the text indicating a function or name of the AR application and wherein the method further comprises:
identifying the object by a location of the AR wearable device; and:
selecting a location for the icon within the image.

6. The method of claim 1 further comprising:
presenting a selection shape on the AR display of the AR wearable device; and
identifying the user input as the selection of the AR application based on the indication of the AR application being within the selection shape.

7. The method of claim 1 further comprising:
selecting the first tag based on the identification of the object.

8. The method of claim 1 further comprising:
processing the user input to identify a gesture, wherein the user input is a movement of an appendage of a user or vocalization of sounds by the user; and
identifying the user input as the selection of the AR application based on gesture matching gesture information associated with the AR application.

9. The method of claim 1 wherein the presenting the indication of the AR application on the AR display of the AR wearable device further comprises:
presenting of the indication of the AR application on the AR display of the AR wearable device at a first position, and wherein identifying the user input as the selection of the AR application further comprises:
capturing, using the image capturing device, a second image;
processing the second image to identify a second location of the indication of the AR application within the second image; and
determining a movement of the indication of the AR application from the first position to the second position indicates the selection of AR application.

10. The method of claim 1 further comprising:
receiving an indication that a scan state is on; and
after the identifying the user input as the selection of the AR application, setting the scan state to off.

11. The method of claim 1 wherein the plurality of AR applications is a first plurality of AR applications, and wherein the method further comprises:
receiving second image data of a second image captured from the image capturing device;
identifying a plurality of objects within the second image, the plurality of objects associated with a first plurality of tags;
selecting a second plurality of AR applications of the first plurality AR applications with tags associated with the second plurality of AR applications matching one or more of the first plurality of tags;
presenting indications of the second plurality of AR application on the AR display of the AR wearable device;
identifying a second user input as a selection of a second AR application of the second plurality of AR applications; and
responsive to the selection of the second AR application, invoking the second AR application.

12. The method of claim 11 wherein the selection of the second plurality of AR applications is based on a frequency of use of the second plurality of AR applications.

13. The method of claim 1 wherein the user input comprises a selection of a button or touch pad of the AR wearable device.

14. The method of claim 1 wherein presenting the indication of the AR application on the AR display of the AR wearable device further comprises:
presenting the indication of the AR application on the AR display of the AR wearable device with actions associated with the AR application on the AR display.

15. The method of claim 1 wherein the AR wearable device is AR glasses.

16. The method of claim 1 wherein the indication of the AR application is presented adjacent to the object.

17. The method of claim 1 wherein the invoking the AR application further comprises:
invoking the AR application with the image data, an indication of the object and an indication of a position of the object within the image.

18. An augmented reality (AR) system comprising:
at least one processor; and
a memory storing instructions that, when executed by the at least processor, configure the at least one processor to perform operations comprising:
registering a plurality of AR applications, each of the plurality of AR application associated with one or more tags of a plurality of tags;
receiving image data of an image captured from an image capturing device;
identifying an object in the image by processing the image data, the object associated with a first tag of the plurality of tags;
matching the first tag with the one or more tags associated with each of the plurality of AR applications to generate a list of matching AR applications;
presenting an indication of the list of matching AR applications on an AR display of an AR wearable device of the AR system;
identifying a user input as a selection of an AR application, of the list of matching AR applications, the AR application associated with a second tag matching the first tag; and
responsive to the selection of the AR application, invoking the AR application.

19. The AR wearable device of claim 18 further comprising:
processing the image using a plurality of neural networks associated with the plurality of AR applications, the plurality of neural networks trained to identify objects associated with tags matching tags of the plurality of AR applications.

20. A non-transitory computer-readable storage medium, including instructions that when executed by at least processor of a virtual reality (AR) system, cause the at least one processor to perform operations comprising:
registering a plurality of AR applications, each of the plurality of AR application associated with one or more tags of a plurality of tags;
receiving image data of an image captured from an image capturing device;
identifying an object in the image by processing the image data, the object associated with a first tag of the plurality of tags;
matching the first tag with the one or more tags associated with each of the plurality of AR applications to generate a list of matching AR applications;

presenting an indication of the list of matching AR applications on an AR display of an AR wearable device of the AR system;
identifying a user input as a selection of an AR application, of the list of matching AR applications, the AR application associated with a second tag matching the first tag; and
responsive to the selection of the AR application, invoking the AR application.

* * * * *